United States Patent Office 2,982,654
Patented May 2, 1961

2,982,654

CHEESE MAKING PROCESS

Earl G. Hammond and Darrell D. Deane, Ames, Iowa, assignors to Iowa State College Research Foundation, Inc., Ames, Iowa, a corporation of Iowa No Drawing. Filed Apr. 7, 1959, Ser. No. 804,589

11 Claims. (Cl. 99—116)

This invention relates to a cheese making process, and more specifically, to a process for manufacturing cheese wherein the use of an acid-producing culture is eliminated.

In conventional processes for making cheeses such as cottage, cream and baker's cheese, bacteria capable of producing lactic acid are allowed to grow in milk until the milk becomes acid enough to coagulate to a firm gel. Alternatively in cottage and baker's cheese and always in cheeses such as Cheddar and Swiss, single or mixed cultures of acid forming bacteria are used in conjunction with enzymes such as rennin and pepsin to produce the desired coagulation. In either case, a starter is used which contains selected strains of acid producing microorganisms for developing acid necessary for milk coagulation, and it is the proper maintenance of such a starter, and its protection from bacteriophage contamination, as well as its control during the coagulation step, that present some of the most difficult problems in the commercial manufacture of cheese. Thus, if a starter or milk should become contaminated, or if the milk should contain an inhibitory substance, then curd formation may not occur or the resulting curd may be defective in terms of its flavor and its physical characteristics.

In an effort to overcome the problems in cheese manufacture arising from the preparation and use of starter cultures, workers in the field have considered the possibility of eliminating starters for the conversion of lactose into lactic acid, and instead, of adding a coagulating acid directly to the milk. However, as brought out by W. I. Tritsnen in an article appearing in Milk Plant Monthly, volume 36, pages 28–30, the direct addition of acid to form cheese curds has not been economically or commercially practical. One important reason is that when acid is added directly to milk, a curd begins to form immediately and agitation is necessary in order to properly intermix the reactants. Such agitation prevents the formation of a solid, well-formed curd and instead a finely divided curd precipitate is produced.

Accordingly, it is a main object of the present invention to provide a process for producing cheese wherein a solid gel, similar to the coagulum formed by using a conventional cheese making technique, is formed during the coagulation step, the coagulation occuring without the use of a starter culture. Another object is to provide a relatively fast process for producing a cheese such as cottage cheese without fermentation, the resultant product being comparable in appearance and other physical characteristics with a similar cheese made by using conventional procedures. A further object is to provide a method for coagulating the casein in milk in a slow and controlled manner, without using acid-forming bacteria, to produce a curd similar to a curd formed when a cultured in used. A further object is to provide a method of reducing the pH of milk in a slow and controlled manner to produce a coagulum in conjunction with rennet or proteolytic enzymes which will yield a curd similar to a curd formed when a culture is used. A further object is to provide a process for producing a cheese with the addition of microorganisms, and in which process the main function of the microorganisms is to alter the flavor and texture of the product. Other objects will appear as the specification proceeds.

An important aspect of the present invention lies in the discovery that a suitable curd for cheese production can be formed by directly adding to milk a neutral substance which will slowly react with water to form an acid capable of coagulating casein. The agent must of course be one which will form a non-toxic acid and which can be completely dissolved or dispersed in the milk. The agent must hydrolyze relatively slowly compared to the rate at which it can be dissolved in the milk. If the acid development is too fast with respect to the rate of solution, local precipitation of the curd may occur near particles of the acidogen or acid-forming agent. In cases where enough acidogen is added to lower the overall pH of the milk below the coagulation point, the acidogen must be dissolved before coagulation begins. If the acid development is to fast with respect to the rate of solution and the coagulum begins to form before the acidogen is entirely dispersed, an uneven coagulum may result, or, if an even coagulum is obtained, the acidity may be difficult to control and may interfere in subsequent steps in the making of the cheese. Specifically, it has been found that if enough of the acidogen is added to milk to drop the pH from its normal value of about 6.5 to 6.8 to a final pH of about 4.6 to 4.7 after complete hydrolysis, the acidogen must be dissolved before the pH reaches the point where coagulation begins, which is about 4.9 to 5.3.

In addition, the acidogen should, in order to produce a nutritive and digestible cheese product, be capable upon hydrolysis of lowering the pH or coagulating the milk without also reacting with and modifying the protein of that milk. While a number of suitable agents might be used, we have found that these results are best obtained with water soluble agents capable of slowly hydrolyzing to form carboxylic acids. Cyclic esters such as lactones and lactides have been found particularly effective as acidogens for this purpose. For instance, excellent results have been obtained witht he low melting lactide (41–42° C.) of lactic acid and with D-glucono-delta-lactone. Both of these materials dissolve or mix readily with milk before coagulum formation begins and both form acids which are believed to be non-toxic and which do not produce undesirable flavors or odors in the final product.

The higher melting (128° C.) isomer of lactic acid lactide is suitable for lowering the pH of milk to a pH of about 5.0. However, due to its rate of solution, if a larger quantity is used to bring about coagulation of the milk, the acid development is difficult to control during subsequent processing. Other materials have been tried but, like the high melting isomer of lactic acid lactide, they are less satisfactory for various reasons than either low melting lactic acid lactide or D-glucono-delta-lactone. Thus, acetic anhydride will hydrolyze to acetic acid and coagulate milk to an even gel, but it also appears to react with the milk protein, probably the protein amine groups. This acetylated protein which is believed to be produced coagulates at a lower pH than normal curd and, while the coagulum can be cut and cooked, it does not have the firmness and texture characteristic of a normal curd. Also, this alteration of the milk protein may well reduce the nutritive value and digestibility of the final cheese product.

The low melting lactide of lactic acid may be prepared by heating lactic acid under reduced pressure. After the lactic acid is dehydrated and polymerized the temperature is raised and the lactide is distilled. The crude distillate is a mixture of high and low melting lactides. These may be separated by crystallization from suitable solvents followed by filtration. The more soluble form melts at 41 to 42° C. in contrast to the less soluble isomer which melts at 128° C. The steps in the preparation and separation of the low melting form are set forth more fully in Example VII.

To make a cheese product by the method of the present invention, the acidogen is added directly to milk and the reactants are then agitated until they are thoroughly mixed. While milk is referred to as the starting material, it will be understood that the term "milk" includes cream and covers liquid dairy products having various relative percentages of fat and non-fat solids. By varying or adjusting the composition of the milk as the starting material, the character of the resulting cheese may be controlled to a considerable extent. For example, Cheddar cheese is ordinarily made from whole milk, of milk in which the fat content has been adjusted to approximately 3.5 percent, while cottage cheese is usually made from skim milk, or from reconstituted, concentrated skim milk or nonfat dry milk solids.

The amount of acidogen added to the milk depends principally upon the buffering capacity of the milk. The buffering capacity is highly correlated with the total solids of the milk, and the amount of acidogen needed for a given level of total solids is found empirically. After this the amount of acidogen which will give the desired pH upon complete hydrolysis may be calculated from the total solids. Where the acidogen is to be the only agent used for coagulation of the milk, its amount should be calculated so that upon complete hydrolysis the liquid will have a pH ranging between 4.5 to 4.8, with an optimum pH value of about 4.7.

Rennet or well-known proteolytic enzymes may be added to the milk in conjunction with the acidogen to increase the rate of coagulation or to alter the properties of the curd. Also to improve the cooking properties of the curd $CaCl_2$ may be added to the milk in conjunction with the acidogen. Since the use of rennet and calcium chloride is well-known in the dairy and cheese producing industry, a more detailed discussion of the use of these materials is believed unnecessary herein. If the cheese is to be ripened, micro-organisms may be added in conjunction with the acidogen to alter the flavor and physical properties of the curd. However, it is to be noted that such ingredients are not necessary for the production of cheese by the present method and that they may or may not be added to the starting materials depending upon the particular characteristics of the product and its formation which are desired.

After thorough distribution of the acidogen in the milk, agitation is discontinued and the coagulum is allowed to form. Specifically, agitation should be discontinued before coagulation has begun—that is, before the pH of the liquid has dropped to a value of approximately 5.1, or at least to a pH value within the range of 4.9 to 5.3. If agitation is continued beyond the point when coagulation begins, then the curd will not form as a solid mass but will instead come down as a finely divided precipitate.

After the acidogen is dispersed the hydrolysis is allowed to proceed with or without the action of enzymes until the hydrolysis and the action of the enzyme if any has proceeded to the desired point. If the product is to be cottage cheese the pH is dropped to a pH of about 4.6 to 4.7. The formed coagulum is then cut with vertical and horizontal wire curd knives to reduce the coagulum to small cubes. After allowing some time for the expression of whey to begin, the curd and whey is heated or cooked by slowly raising the temperature to 120–140° F. When the cooking is judged to be complete, the whey is drained, and the curd is washed, drained, and refrigerated. Since the cutting, cooking, draining, washing and refrigerating of the cottage cheese is entirely conventional, more complete description of these procedures is believed unnecessary.

The following examples further illustrate the process of the present invention.

*Example I*

To 2,000 g. of reconstituted skim milk containing 8.73% solids, having a pH of 6.70 and temperature of 25° C., 17.46 g. of powdered low melting lactide of lactic acid was added and stirred into the milk with a mechanical stirrer. Stirring continued for twenty minutes. Fifteen minutes after the lactide was added, 2 ml. of a one to one-thousand dilution of commercial rennet was added. The milk was allowed to stand after the lactide and rennet had been stirred in. Eighty minutes after the addition of the lactide the coagulum was cut with ¼ inch knives and cooked by a standard procedure for cottage cheese. The yield of curd was 16%, and the curd had a solids content of 20.1%. The curd had the normal appearance and texture of cottage cheese curd and had a bland flavor. No off-flavors were detected.

*Example II*

To 2,000 g. of skim milk with 8.81% solids, 0.4 g. of calcium chloride was added with the aid of a mechanical stirrer. The pH of the milk was 6.60 after the addition of the calcium chloride. The temperature was adjusted to 25° C. and 15.60 g. powdered low melting lactic acid lactide was added and stirred into the milk. After twenty minutes following introduction of lactide, the pH of the milk was found to be 5.40, and agitation by means of the mechanical stirrer was then discontinued. One hundred fifty minutes after the lactide had been added, the coagulum was cut with ¼ inch knives and was cooked, drained and washed by standard cottage cheese manufacturing procedures. The pH of the curd at the time of cutting was approximately 4.71. The curd had normal body, appearance and texture, and a bland flavor. No off-flavors were detected. Yield of curd was 16.6% with a solid content of 20.8%.

*Example III*

Four-tenths g. of calcium chloride was stirred into 2,000 g. of skim milk containing 9.21% solids. The pH of the milk and calcium chloride was 6.63. The temperature was brought to 25° C., and 16.30 g. of powdered low melting lactic acid lactide was added and stirred into the milk for twenty-five minutes. Eighteen minutes after the lactide had been added, 3 ml. of a one to one-thousand dilution of commercial rennet was added. Following the cessation of stirring, the pH of the milk was 5.30. After 120 minutes (from the time of lactide addition), the coagulum was cut with ¼ inch knives and was cooked by a standard procedure for cottage cheese. The yield of curd was 16.8% and it was 20.6% solids. The appearance and texture of the curd was normal, the flavor bland, and no off-flavors were detected.

*Example IV*

Fourth-tenths g. of calcium chloride was stirred into 2,000 g. of skim milk containing 8.90% solids. The pH was 6.50. The milk was brought to 30° C. and 16.02 g. of powdered low melting lactic acid lactide was added and stirred in for 11 minutes. Eight minutes after adding the lactide, 3 ml. of a one to one-thousand dilution of commercial rennet was added. At the time that stirring was discontinued, the pH of the milk was 5.30. 60 minutes after adding the lactide, the coagulum was cut, as set forth in Example I. The yield of curd was 16% and it was 20.9% solids. As in the foregoing examples, the appearance and texture of the curd were normal, as compared with a curd formed by the conventional procedures involving the use of a starter, and the flavor of the curd was bland. No off-flavors were detected.

*Example V*

Four-tenths g. of calcium chloride was stirred into 2,000 g. of skim milk containing 9.06% solids. The pH of the milk was 6.62 and the temperature was 20° C. Then, 21.4 g. of D-glucono-delta-lactone was added and stirred into the milk for three minutes. At the time that stirring was discontinued, the pH of the liquid was approximately 6.40. After seventeen hours, the coagulum was cut with ¼ inch knives and cooked by a standard procedure for cottage cheese. The yield of curd was 16.2% and it was 21.4% solids. The curd had the body, appearance and texture of a curd formed by conventional procedures involving the use of a starter. The flavor of the curd, after draining and washing, was bland, and no off-flavors were detected.

Example VI

Four-tenths g. of calcium chloride was stirred into 2,000 g. of skim milk. Containing 9.06% solids the pH of the milk was 6.60. The temperature was brought to 20° C. and 21.80 g. of D-glucono-delta-lactone was stirred into the milk for three minutes. 3 ml. of a one to one-thousand dilution of commercial rennet was added and stirred in for one minute. After addition of the rennet, the pH of the solution was approximately 6.3. After fourteen hours, the coagulum was cut with ¼ inch knives and was cooked, drained and washed by the standard cottage cheese procedure followed in the other examples. The yield of curd was 16.2% and it contained 21.5% solids. As in the other examples, the appearance and texture of the curd were normal and the flavor was bland. No off-flavors were detected.

Example VII

Two thousand g. of skim milk with 8.60% solids were treated with 0.8 g. of calcium chloride. The pH dropped from 6.70 to 6.58 on addition of the calcium chloride. Then, 16 ml. of acetic anhydride were added and stirred into the milk for two minutes. At the time that stirring was discontinued, the pH of the solution was approximately 5.0. Twenty minutes after the acetic anhydride was added to the milk, a final pH of 4.30 was reached. After 135 minutes (from the time of adding the acetic anhydride), the curd was cut with ¼ inch knives and cooked by the conventional procedure used for cottage cheese. The curd was soft and mushy. The curd was then soaked in the final wash water for several hours to leach out the acetic acid. The yield was 22.5% and the solid content was 12.9%. The curd was found to have a faint but not unpleasant acid flavor. The texture of the curd was weak.

Example VIII

The low melting isomer of lactic acid lactide, as described in the specification and as set forth in the procedures of Examples I–IV, may be prepared as follows:

One kg. of 80% lactic acid is heated in an open vessel at 120° C. When the water of dilution has almost ceased to boil-off (about five hours), connect the flask to a distilling head and receiver and reduce the pressure to between 60 to 70 mm., with a water pump. Heat the charge to 140–150° C., and as the water of esterification is removed the pressure will drop to 12 mm. This takes about twelve hours. Any distillate which collects in the receiver should be returned to the pot after about two hours and again at seven hours. When the dehydration is complete, 9 g. of zinc oxide are added to the pot, the pressure is reduced to 5 mm., and the pot is heated from between 170° to 220° C. as the lactide distills.

The crude lactide that collects in the pot is a mixture of two forms, one of which melts at 128° C. and the other at 41–42° C. To resolve this mixture, the 617 g. of crude distillate is crystallized from 350 ml. chloroform at 15° C. The filtrate contains the low melting form. It is freed of chloroform by heating to 120° C., and the residue is crystallized from 350 ml. diethylether at 15° C. More high melting lactide may then be crystallized and removed by filtration. Thereafter, the filtrate should be cooled to minus 30° C. to recover the low melting lactide.

217 g. of low melting lactide were recovered by following the above procedure. This was recrystallized from 300 ml. of diethylether to yield 178 g. of low melting lactide.

Example IX

To 240 pounds of milk having a solids content of 9.17% and a temperature of 76° F., 2.71 pounds of D-glucono-delta-lactone was added. The lactone was stirred in with a paddle for about three minutes. Ten minutes after adding the lactone the pH was 6.05. The temperature was adjusted to 94° F. in the course of half an hour. Four and one-quarter hours after the lactone was added, the pH had dropped from its original value of 6.65 to 4.73, and the coagulum was cut with standard curd knives. The curd was cooked by usual procedures. The yield was 39 pounds of curd (16.2%) which contained 22% moisture. The curd had a normal appearance and texture and a bland flavor. No off flavors were detected.

Example X

To 2,000 grams of milk containing 8.82% solids, having a pH of 6.68 and a temperature of 25° C., 17.78 g. of low melting lactide was added and stirred in for 25 minutes. The pH was 5.20 when the stirring was stopped. A firm coagulum formed 65 minutes after the addition of the lactide. The coagulum was cut with ¼ inch curd knives and cooked by standard procedures. The yield was 370 g. of curd (18.5%) with a solids content of 18.2%. The curd had normal appearance and texture and a bland flavor. No off flavors were detected.

While in the foregoing, we have set forth an embodiment of the invention in considerable detail for purposes of illustration, it will be understood by those skilled in the art that many of these details may be varied without departing from the spirit and scope of the invention.

We claim:

1. In a cheese making process wherein a firm, compact and homogeneous curd is formed, the steps of introducing a neutral and water-dispersible acidogen into a selected quantity of milk, said acidogen being capable of slowly hydrolyzing to form a non-toxic and edible acid, intimately mixing said milk and acidogen, and thereafter discontinuing said mixing before curd formation begins.

2. The process of claim 1 in which said acidogen is a low melting isomer of lactic acid lactide, said isomer melting at approximately 41 to 42° C.

3. The process of claim 1 in which said acidogen is D-glucono-delta-lactone.

4. In a cheese making process wherein a firm, compact and homogeneous curd is formed, the steps of introducing a neutral and water-soluble agent capable of slowly hydrolyzing to form a non-toxic and edible carboxylic acid into a quantity of milk having a pH within the range of approximately 6.5 to 6.8, agitating said milk and agent to intimately mix the same, and discontinuing said agitation when said agent has hydrolyzed sufficiently to drop the pH of the milk to within the range of between 4.9 to 5.3.

5. The process of claim 4 in which said neutral agent is the low melting lactide of lactic acid, said lactide having a melting point of approximately 41 to 42° C.

6. The process of claim 4 in which said neutral agent is D-glucono-delta-lactone.

7. The process of claim 4 in which said neutral agent is acetic anhydride.

8. In a cheese making process wherein a firm, homogeneous and compact curd is formed, the steps of introducing into a quantity of milk a water-soluble cyclic ester capable of slowly hydrolyzing to form a non-toxic and edible carboxylic acid, the amounts of milk and ester being adjusted so that upon complete hydrolysis of the ester the milk will be acidified to a pH within the range of between 4.5 to 4.8, agitating said milk and said ester until the ester has hydrolyzed sufficiently to drop the pH of the milk to within the range of between 4.9 to 5.3, and thereafter allowing the acidified milk to set for curd formation until the ester is substantially completely hydrolyzed.

9. The process of claim 8 in which said cyclic ester is the low melting isomer of lactic acid lactide.

10. The process of claim 8 in which said cyclic ester is D-glucono-delta-lactone.

11. The process of claim 9 in which said lactide is prepared by heating lactic acid to dehydrate the same, and thereafter crystallizing and filtering the residue to separate the low melting lactide filtrate.

References Cited in the file of this patent

UNITED STATES PATENTS

| | | |
|---|---|---|
| 2,441,729 | Steiner | May 18, 1948 |

FOREIGN PATENTS

| | | |
|---|---|---|
| 455,691 | Great Britain | Oct. 23, 1936 |